Patented Jan. 8, 1924.

1,479,852

UNITED STATES PATENT OFFICE.

ALFRED ENGELHARDT, OF WIESDORF, PRUSSIA, GERMANY, ASSIGNOR TO FARBEN-FABRIKEN VORM. FRIEDR. BAYER AND CO., OF LEVERKUSEN, NEAR COLOGNE-ON-THE-RHINE, GERMANY.

PROCESS FOR TREATING AND PURIFYING GASES CONTAINING HYDROGEN SULPHIDE.

No Drawing.   Application filed August 8, 1921. Serial No. 490,712.

*To all whom it may concern:*

Be it known that I, ALFRED ENGELHARDT, doctor of philosophy, a citizen of Germany, residing at Wiesdorf, Germany, have invented new and useful Improvements in Processes for Heating and Purifying Gases Containing Hydrogen Sulphide (for which applications have been filed in Germany, May 24, 1917, Patent No. 303,862; Germany, July 3, 1918, Patent No. 338,829; Germany, October 2, 1918, Patent No. 371,400; Germany, Oct. 3, 1918, Patent No. 337,059; Germany, Oct. 30, 1919, Patent No. 340,036; France, June 19, 1920, Patent No. 517,483; England, Oct. 15, 1920, Patent No. 153,297; Austria, Apr. 2, 1918, Patent No. 87,471; Austria, June 18, 1920, Patent No. 89,931; Italy, June 21, 1920, Patent No. 532,125; Belgium, June 17, 1920, Patent No. 287,648; Switzerland, June 28, 1920, Patent No. 89,553), of which the following is a specification.

As is known sulfur can be obtained on a large scale by leading hydrogen sulphide or gases containing it while mixed with air over ferric oxid or bauxite at a dull red heat to effect the reaction:

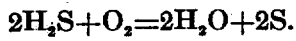
$$2H_2S + O_2 = 2H_2O + 2S.$$

This method however is not economical and the reaction is incomplete as part of the $H_2S$ remains in the gas and part of it is oxidized to sulfur dioxid, moreover mixtures containing combustible gases, such as are obtained by the dry distillation of coal cannot be employed in this process.

According to this invention hydrogen sulphide gas mixed with the quantity of air or oxygen necessary to effect the formation of sulfur is brought into contact with a specially porous active carbon such as described in the German specification 290656 of April 25th, 1914, which has been treated with dehydrating agents. According to German Patent No. 290,656 a highly active charcoal is obtained by heating a carbon-containing substance, such as wood, cellulose, starch, coal, offal, etc., with zinc chloride. External heat is unnecessary for the reaction. The sulfur separates out in the carbon in a very finely divided state. It is then isolated and purified by sublimation or by extraction with a solvent, such as carbon bisulfid, mono- or dichlorbenzene.

If gases having a high content of $H_2S$ are employed a considerable evolution of heat takes place and the sulfur precipitates upon the carbon either in a fused state or as flowers of sulfur. All kinds of gases containing hydrogen sulphide may be employed and the process may also be used for completely desulfurizing illuminating gas.

The action of the porous active carbon in question is extraordinarily intense and it has been found to absorb more than its own weight of sulfur. These carbons are thus much superior to ordinary vegetable or animal charcoal.

In order to illustrate the process more fully the following example is given:—A mixture of 2 volumes of hydrogen sulphide and 5 volumes of air is led through a cylindrical tube filled with 1000 volumes of charcoal as described in the German specification 290656 of April 25th, 1914. A strong evolution of heat takes place. The fused sulfur runs out of the apparatus. Instead of oxygen sulfur dioxid can be used.

If a gas is used having a small content of hydrogen sulphide the oxidation of hydrogen sulphide into sulfur is accelerated by the addition of small quantities of ammonia or amins. Even a large quantity of gas containing these additions requires a smaller carbon filter than a gas not containing these additions. On using $SO_2$ of course amins cannot be used.

I claim:—

1. Process of oxidizing hydrogen sulphide which comprises contacting gas containing hydrogen sulphide and oxygen with porous active carbon such as may be obtained by heating carbonaceous organic materials with dehydrating agents.

2. Process of oxidizing hydrogen sulphide which comprises contacting gas containing hydrogen sulphide and oxygen with porous active carbon capable of causing the hydrogen sulphide and oxygen to react in the absence of externally applied heat.

3. Process of oxidizing hydrogen sulphide which comprises contacting gas containing hydrogen sulphide and oxygen with porous active carbon obtained by heating carbonaceous organic material with zinc chlorid.

4. Process of oxidizing hydrogen sulphide which comprises contacting gas containing hydrogen sulphide and an oxidizing gas with porous active carbon obtained by heating carbonaceous organic material with a dehydrating agent.

5. Process of oxidizing hydrogen sulphide which comprises contacting gas containing hydrogen sulphide, oxygen and an amine with porous active carbon capable of causing the hydrogen sulphide oxygen to react in the absence of externally applied heat.

6. Process of oxidizing hydrogen sulphide which comprises contacting a gas containing hydrogen sulphide mixed with air and a basic nitrogen compound with porous carbon.

7. Process as defined in claim 6 in which ammonia is the basic nitrogen compound employed.

In testimony whereof I have hereunto set my hand in the presence of two subscribing witnesses.

ALFRED ENGELHARDT. [L. S.]

Witnesses:
   JOHANNA NORRENBERG.
   JOHANNES OÜEIUS.